Patented Dec. 28, 1943

2,337,552

UNITED STATES PATENT OFFICE 2,337,552

PURIFICATION OF SATURATED HYDRO-CARBON SULPHONIC ACIDS

Clyde O. Henke, Wilmington, Del., assignor to E. I. du Pont de Nemours & Company, Wilmington, Del., a corporation of Delaware No Drawing. Application August 15, 1940, Serial No. 352,797

5 Claims. (Cl. 260—513)

This invention relates to the preparation of purified aliphatic and/or cycloaliphatic sulphonic acids or their salts. More particularly it relates to a process for recovering water-soluble aliphatic and/or cycloaliphatic sulphonic acids or salts from the hydrolysis and neutralization products of the corresponding sulphonyl halides, especially sulphonyl chlorides. The invention also relates to the manufacture of purified surface active compositions from the hydrolysis products of higher aliphatic and/or cycloaliphatic sulphonyl halides, especially chlorides.

Recently, surface active agents have been prepared from higher aliphatic and/or cycloaliphatic hydrocarbons by first converting the same to sulphonyl halides, especially sulphonyl chlorides and subsequently converting the sulphonyl halides to true sulphonic acids and their water soluble salts. One economical process which results in a rather complex mixture of primary and secondary mono- and polysulphonyl chlorides containing varying amounts of chlorine attached to carbon involves reacting higher aliphatic or cycloaliphatic hydrocarbons or mixtures thereof with admixed sulphur dioxide and chlorine and hydrolyzing and neutralizing the resulting sulphonyl chlorides.

A related process which results in similar products comprises reacting such hydrocarbons with sulphuryl chloride in the presence of a catalyst and/or actinic light until sulphonyl chlorides are formed and hydrolyzing and/or neutralizing the resulting compounds to form water-soluble salts.

Each of the above-described processes results in surface active products which contain varying amounts of unreacted hydrocarbons and chlorinated hydrocarbons. The presence of these ingredients adversely affects the wetting efficiency of the products.

This invention has for an object the preparation of surface active agents from higher aliphatic and/or cycloaliphatic sulphonyl halides, especially chlorides, possessing high wetting efficiency. A further object is to prepare such products in an economical manner. A further object is to obtain purified sulphonates from the above and other reaction masses. A still further object is to prepare such products by utilizing economical and readily available materials and apparatus. A still further object is the preparation of a relatively concentrated aqueous solution of such surface active agents which are not contaminated with a preponderance of inorganic materials. Still other objects will be apparent to those skilled in the art from the hereinafter described invention.

The above objects are accomplished by the hereinafter described invention which comprises removing the unsulphonated hydrocarbon, particularly liquid hydrocarbon or oil from an aqueous solution of water-soluble higher aliphatic or cycloaliphatic sulphonates from crude reaction mixtures by a liquid phase extraction with a high boiling normally solid hydrocarbon.

In one important aspect the invention comprises removing the unsulphonated hydrocarbon, particularly liquid hydrocarbon or oil from an aqueous solution of water-soluble higher aliphatic or cycloaliphatic sulphonates obtained from a conversion of the corresponding sulphonyl halides by a liquid phase extraction with a normally solid hydrocarbon.

The extraction is, of course, carried out in the liquid state. The bulk of the hydrocarbon material is removed while in the molten state, the aqueous layer is then cooled and the hydrocarbon portion which settles out removed and the filtrate is concentrated.

The purified aqueous solutions may be concentrated by salting out the sulphonate with a strong electrolyte solution. The resulting solution may be standardized in any desired manner.

The invention may be used with a wide variety of sulphonates as will be described hereinafter. It is particularly adapted to the purification and separation of sulphonates containing an aliphatic hydrocarbon nuclei of at least 5 carbon atoms or a cycloaliphatic hydrocarbon nuclei of at least 6 hydrocarbons from mixtures containing hydrocarbons or hydrocarbon derivatives containing nuclei of the same number of carbon atoms.

The invention shall be further illustrated but is not intended to be limited by the following examples wherein the parts stated are parts by weight.

*Example I*

The sodium salts of hexadecane sulphonic acids are prepared by passing a gaseous mixture of 89 parts of sulphur dioxide and 70 parts of chlorine into 300 parts of hexadecane over a period of 30 minutes. The reaction flask is illuminated with a 150 watt tungsten lamp. The reaction mass gains 90 parts by weight. The so formed hexadecane sulphonyl chlorides mixed with hexadecane and containing some chloro derivatives of each are hydrolyzed to the corresponding hexadecane sodium sulphonates by hydrolyzing with 240 parts of hot 30% sodium hydroxide. To the resulting product are added 300 parts of molten refined paraffin wax, having a melting point of 50° C. (122° F.), 1300 parts of water, and 101 parts of ethyl alcohol. The mixture is heated and stirred and let stand. The molten paraffin and unsulphonated oils separate as a top layer. The lower aqueous layer, which is 1512 parts by weight shows on analysis a hexadecane sodium sulphonate content of 11.0% and an unsulfonated oil content of 0.37%. A wetting test by the Draves-Clarkson skein sinking method shows sinking in 25 seconds at 77° F. at a concentration of 0.68 g. hexadecane sodium sulfonate per liter.

Naphthalene may be substituted for the paraffin wax with similar results.

Example II

A crude aqueous solution of the hexadecane sodium sulphonates prepared as in Example I of 692 parts by weight are diluted with 1284 parts of water and 100 parts of ethyl alcohol and heated to 60° C. On standing the major portion of the unreacted hexadecane separates as a top layer. The lower aqueous layer is withdrawn and stirred with 300 parts of paraffin at 70–80° C. for one hour. The mixture is poured into a separatory funnel and the major proportion of the paraffin separates as a molten upper layer. The lower aqueous layer is withdrawn and cooled. Solid paraffin crystallized out from the aqueous solution and is filtered off at 22° C. The aqueous filtrate analyzes 12.6% hexadecane sodium sulphonate and 0.37% unsulphonated oil. The product has wetting properties similar to that of Example I.

Example III

A Pennsylvania base mineral oil is purified by suitable means so that it is substantially free from aromatic and olefinic constituents and has the following characteristics: A distillation range of 267° C. to 310° C.; a Saybolt Universal viscosity at 100° F. of 37 seconds; a refractive index at 20° C. of 1.444; a specific gravity at 15.5° C. compared to water at 15.5° C. of 0.804. This oil is treated with a gaseous mixture of sulphur dioxide and chlorine in a molar ratio of 1.4 to 1.0 at about 30° C. in the presence of light having a radiation range of 4000 Å. to 5800 Å. until the specific gravity at 30° is 0.940. The resulting aliphatic sulphonyl chloride contaminated with unsulphonated oil and some chloro derivatives is hydrolyzed to the corresponding sodium sulphonate with hot 30% sodium hydroxide. The crude mass is diluted with twice its weight of water and eight one-hundredths of its weight of ethyl alcohol, heated to 60–65° C., and allowed to stand. The major portion of unsulphonated oil separates as a top layer. The lower aqueous layer is withdrawn and analyzes 12.3% aliphatic sodium sulphonate and 1.02% unsulphonated oil.

Fifteen hundred parts of this solution is stirred with 75 parts of paraffin wax melting at 130° F. (54° C.) and 75 parts of isopropyl alcohol at 60–65° C. for 30 minutes. The mixture is cooled slowly to 17° C. A solid cake of wax separates on top and is removed. The remaining crystallized wax is filtered off. The resulting filtrate analyzes 12.5% aliphatic sodium sulphonate and 0.23% unsulphonated oils.

Eleven hundred and eighty-eight parts of the filtrate is heated to 95° C. with 290 parts of sodium chloride and 63 parts of water. The mixture is poured into a separatory funnel. A separation into layers took place quickly, a concentrated sodium chloride solution forming the lower layer and a concentrated aliphatic sodium sulphonate solution forming the upper layer. The lower layer is drawn off and discarded. The upper layer of concentrate is 443 parts by weight. To the upper layer is added 22 parts by weight of isopropyl alcohol and the mixture is heated to 70°. A further separation of sodium chloride solution and sodium chloride occurs as a lower layer which is drawn off. The upper layer of 384 parts by weight is diluted with 34 parts of water to give a clear stable solution. This solution analyzes 31.7% aliphatic sodium sulphonates and a wetting test shows that 2.1 g. of the solution per liter gives sinking in 25 seconds by the Draves-Clarkson skein-sinking method. To 200 parts of the above solution are added 4 parts of n-octyl alcohol to form a clear solution. This product when tested for wetting efficiency as above shows sinking in 25 seconds at a concentration of 1.8 g. per liter.

Naphthalene may be substituted for the paraffin wax with similar results.

Example IV

Fifteen hundred parts of a sodium alkyl sulphonate solution analyzing 10.3% active ingredient prepared as in the first paragraph of Example III was mixed with 146 parts of borneol terpenes, 30% of isopropyl alcohol and 370 parts of sodium chloride. The mixture was heated to 85–90° and poured into a separatory funnel. The mixture separated into layers rapidly. The lower layer which was a concentrated salt solution was withdrawn and discarded. The upper layer which was a concentrated solution of sodium alkyl sulphonate and terpenes weighed 433 parts by weight. To this was added 18 parts of water and a clear solution was obtained. The product gave wetting by the Draves-Clarkson skein-sinking method of 1.89 g. per liter at 25° C. The product likewise has excellent sudsing and detergent properties. If desired the solution of sodium alkyl sulphonates may be extracted with paraffin before the salting out step as disclosed in Example III.

Example V

A gaseous mixture of 902 parts by weight of sulphur dioxide and 297 parts by weight of chlorine were passed at a uniform rate for four hours through 200 parts by weight of menthane contained in a flask which was illuminated by a 60 watt incandescent light. Heat was evolved during the reaction. The temperature was maintained at 40° C. by means of a water bath. At the end of four hours the menthane had gained 201 parts by weight. The product formed at this stage apparently contained menthane sulphonyl chlorides, chlormenthane sulphonyl chlorides and small amounts of chlormenthane. The reaction product was then added to 500 parts of 30% sodium hydroxide solution. The temperature during neutralization was maintained at 90° to 95° C. About 883 parts of product were obtained. The product was diluted with 237 parts of water. An insoluble oil layer separated and was removed.

To 900 parts of the solution so obtained were added 75 parts of a paraffin wax melting at 50° C. and the mixture was heated to 65° C. and stirred for 30 minutes. The mixture was poured into a separatory funnel and allowed to stand whereupon a layer of molten paraffin separated at the top. The lower aqueous layer was withdrawn and cooled to 20° C. Solid paraffin precipitated out. This was removed by filtration and clear pale yellow aqueous solution was obtained. This solution showed high wetting power when dissolved in 52° Tw. caustic soda solution.

The processes of this invention may be modified in a number of ways without departing from the scope of the invention. Thus the extraction of the unsulphonated oil may be made at any convenient temperature from the melting point of the hydrocarbon or derivative or lower to the boiling point of the solution. Various water miscible agents such as methyl, ethyl, propyl and isopropyl alcohols, acetone, etc., may be added to the solution to lower the amount of paraffin wax emulsified in the solution if desired.

The temperature to which the solution may be cooled before filtering off the separated or crystallized hydrocarbon or derivative may be varied but in general a temperature is selected slightly above that at which the aliphatic sulphonates would tend to separate with the hydrocarbon or derivative. The extraction is generally carried out at atmospheric pressure; however higher pressures may be resorted to if desired.

While each of the working examples is directed to the use of paraffin wax and more particularly to the lower melting paraffin waxes, the invention is not limited to the use of this narrow class of materials. Various other types of paraffin waxes and petroleum hydrocarbon waxes in general may be substituted with similar results. Suitable other waxes include match wax, scale wax, hard and soft paraffin wax, higher melting paraffin waxes, micro-crystalline paraffin waxes, petrolatum waxes, mixtures of any or all of the above, etc.

Nor is the invention limited to the use of hydrocarbon waxes for any hydrocarbon or relatively inert derivative which is solid at about room temperature, i. e., 20° C. and which melts at a more elevated temperature, preferably between 30 and 80° C. and which is capable of forming a solution with the unsulphonated oil may be used. Suitable additional materials include hexachloro ethane, aromatic hydrocarbons, e. g., naphthalene, methyl anthracene, octadecylbenzene, tetramethyl benzene, acenaphthene, etc., substituted aromatic hydrocarbons such as p-dichlorobenzene, tetrachlorobenzene, 2-chloronaphthalene, dichloronaphthalene, etc., alkanes, e. g., eicosane, heneicosane, tricosane, hentriacontane, pentatriacontane and hexacontane, etc., and their halogen derivatives; the normally solid high molecular weight monohydric alcohols, e. g., dodecyl, tetradecyl, hexadecyl and octadecyl and their fatty acid esters, e. g., the acetates, propionates, butyrates, stearates, palmitates, etc. Mixtures of each of the above may also be used.

The water-soluble sulphonates treated are not limited to the sodium sulphonates set forth in the preceding examples. On the contrary, a wide variety of other water-soluble sulphonates may be removed. In addition to alkali metal salts, including lithium, sodium, potassium, ammonium, calcium, magnesium and other salts, the corresponding free acids may be similarly purified.

The preferred agents are the normally solid alkanes and paraffin waxes and mixtures thereof. These agents have a number of distinct advantages in that they are readily available commercially, low in cost and their use does not introduce any deleterious material into the final product.

The salting out step may be practiced at various temperatures from room temperature to the boiling point of the solution. In general, the higher the temperature the higher is the concentration of the aliphatic sulphonate solution obtained. A great many electrolytes other than those listed in the specific examples may be substituted therefor or used in conjunction with any of the materials disclosed herein with similar results. The types of electrolytes useful are exceedingly diverse in character. Representative materials include alkali metal, especially sodium and potassium and ammonium hydroxides, halides, carbonates, nitrates, borates, phosphates, sulphates, formates, acetates, malates, citrates, tartrates and benzoates. Specific salts falling within certain of the above categories include sodium and potassium chloride, bromide, iodide, metaborate, phosphate (mono-, di- and tri-basic), sulphate, ammonium chloride, zinc chloride, sulphuric acids, hydrochloric acid, etc. In general electrolyte solutions containing at least 20% weight are effective, however, lower concentrations can be used. The particular concentration to be used depends on the particular sulphonate treated and the electrolyte chosen.

Various additive agents may be used in the standardizing of the concentrated solution of aliphatic sulphonate. These agents may or may not confer added wetting properties to the product. Thus, monohydric water-miscible alcohols such as methyl, ethyl, propyl, butyl, and their isomers, di- and polyhydric alcohols such as ethylene glycol, propylene glycol, glycerol, sorbitol, sugars, etc., may be added. Other compounds of such diversified nature as urea, ethanolamines, casein, the higher alkyl sodium sulfates, water-immiscible alcohols such as octyl, decyl, hexyl, and dodecyl, or "Lorol" which is a mixture of higher molecular weight alcohols, terpineol, pine oil, terpenes, terpene alcohols, ammonium sulphamate, polyvinyl alcohols, etc., may be used to confer various properties on the standardized product.

The aliphatic and cycloaliphatic sulphonate mixtures purified are not limited to those set forth in the specific examples. On the contrary any of the sulphonates obtained by conversion of normally liquid to solid aliphatic or cycloaliphatic hydrocarbons into sulphonyl chlorides and hydrolysis and neutralization may be substituted and processed in a similar manner. Suitable sulphonates are disclosed in U. S. Patents 2,174,505, 2,174,506, 2,174,507, 2,174,508, 2,174,509, 2,197,800 and 2,263,312. The sulphonates which may be purified are not limited to those obtained from a reaction with admixed sulphur dioxide and a halogen or sulfuryl halides and subsequent hydrolysis and neutralization as described above, but may be applied to the sulfonate products obtained by chlorinating higher alkanes, mineral oils, etc., then reacting the resulting chlorinated products with thiourea to give the isothiourea derivative, oxidizing the resulting products with chlorine water and hydrolyzing and/or neutralizing the resulting sulphonyl chlorides. The last-mentioned processes are set forth in U. S. Patents 2,142,934, 2,146,744, 2,147,346, and 2,174,856.

Furthermore, solutions of sulphonates obtained in other ways such as the oxidation of sulphides or mercaptans, the action of sulphites on halogenated hydrocarbons, the sulphonation of hydrocarbons or their derivatives with sulphonating agents may be purified by this method.

The water-soluble compositions produced according to this invention have considerable surface-activity and other valuable properties, and may be used as mercerizing assistants, corrosion inhibitors, gum solvents for gasoline, extractants for the refining of gasoline, pour point depressants, insecticides, fly spray ingredients, weed killers, soil fumigants, cotton immunization chemicals, anti-shrinking agents for wool, foaming agents, mold inhibitors, lubricants for steel drawing and metal working, crease-proofing agents, viscose modifiers, pharmaceuticals, detergents, wetting agents, rewetting agents, for improving textile treating processes, including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing paste, the preparation of lakes, the preparation of inorganic pigments and household dye preparations. They may also be useful in improving processes of dyeing leather and textiles including dyeing with developed dyes, dyeing in neutral, acid or alkaline dye baths, dyeing of animal fibers with vat dyes, etc. They may also be useful in treating oil wells and to improve flooding oil bearing sands. They may also be used to improve radiator cleaning compositions, cleansing compositions as household detergent compositions, shampoos, dentifrices, washing of paper mill felts, etc. They may also be used to improve fat liquoring and leather treatment processes as well as for fat splitting agents. They may also be useful in improving the preservation of green fodder. They may also be useful in improving the removal of fibrous layers from surfaces and in metal cleaning. They may also be used to improve flotation processes of ores, pigments, coal, etc. They may also be useful in breaking petroleum emulsions or in different concentrations as emulsifying agents. They may also be useful in improving food preparations. They may be useful in improving the cooking of wood pulp. They may also be useful in providing improved ceramic assistants and processes to improve the setting of cement. They may also be useful in storage batteries and dry cells. Other uses for these products or their derivatives are as fungicides, accelerators, delusterants, extreme pressure lubricants, moth proofing agents, antiseptics, fire-proofing agents, mildew preventers, penetrating agents, anti-flexing agents, tanning agents, lathering agents, dust collecting agents, antioxidants, color stabilizer in gasoline, etc.

The surface activity of some of the herein described compositions may be modified or in some cases enhanced by the addition of other surface-active agents, e. g. alkylated naphthalene sulphonic acids and their water-soluble salts, salts of higher alkyl sulphuric acid esters as described in Bertsch Patents Nos. 1,968,794 to 1,968,797, long chain betaine derivatives both of the C— and N— and open type which are illustrated by Daimler et al., Patent No. 2,082,275, Belle et al., 2,087,565, Platz et al., Patent No. 2,097,864, and Balle et al., 2,101,524, long chain ammonium, sulphonium and phosphonium compounds, as well as numerous other soap substitutes. A few representative uses are set forth in Reed application, Serial No. 216,332, filed June 28, 1938, and it is to be understood that the products produced according to this invention may be substituted in like amount for the products of each of the examples of that case.

The invention has particular utility in purifying the sodium and potassium sulphonates obtained from the alkane mono- and poly-sulphonyl chlorides and chloroalkane mono- and poly-sulphonyl chlorides having at least 12 carbon atoms from mixtures containing them and normally liquid or solid hydrocarbons. The surface activity, deterging and wetting properties of these products are enhanced quite materially. Furthermore, the surface activity per unit of weight is substantially increased by virtue of the increased concentration of the product.

The process of extraction of the unsulphonated oil from the aliphatic sodium sulphonate solutions is a very appreciable improvement over the ordinary methods of extraction with volatile solvents. When solvents such as petroleum ether, carbon tetrachloride, benzene, ether, trichlorethylene, etc. are used, very stable emulsions are formed. The emulsion may be so permanent that a clear solution of the solvent in the aliphatic sulphonate solution is formed. It is difficult to break these emulsions. When the solution is heated to drive off the emulsified solvent, the unreacted oil dissolved by the solvent is left in solution. However, when paraffin wax, for example, is used as the solvent, the solubility in the aqueous aliphatic sulphonate is more limited. Further, when the solution is cooled so that the small amount of emulsified paraffin will crystallize, the unreacted oil stays in the solid paraffin rather than in the solution and is filtered off.

The salting out step of the process is advantageous in that it permits an easy way to obtain concentrated solutions. Otherwise it would be necessary to evaporate the water from the solution. This evaporation is accompanied by excessive foaming and some darkening of color of the solution.

As many apparently widely different embodiments of this invention may be made without departing from the spirit and scope thereof, it is to be understood that I do not intend to limit myself to the specific embodiments herein except as defined by the appended claims.

I claim:

1. A process of removing hydrocarbon impurities from an aqueous solution of a water soluble saturated hydrocarbon sulphonate having at least 5 carbon atoms taken from the group consisting of sulphonic acids and water soluble salts thereof, which comprises mixing therewith in the liquid state a hydrocarbon which is solid at 20° C., allowing the mixture to stand, removing the layer of molten hydrocarbon, cooling the aqueous phase and removing the hydrocarbon which separates out in the solid state.

2. A process of removing hydrocarbon impurities from an aqueous solution of a water soluble salt of a saturated hydrocarbon sulphonic acid having at least 12 carbon atoms which comprises mixing therewith in the liquid state a hydrocarbon having a melting point between 30° C. and 80° C., allowing the mixture to stand, removing the layer of molten hydrocarbon which forms, cooling the aqueous phase, and removing the hydrocarbon which separates out in the solid state.

3. A process of removing hydrocarbon impurities from an aqueous solution of alkali metal salt of a saturated hydrocarbon sulphonic acid having at least 12 carbon atoms which comprises mixing therewith in the liquid state a hydrocarbon having a melting point between 30° C. and 80° C., allowing the mixture to stand, removing the layer of molten hydrocarbon which forms, cooling the aqueous phase, and removing the hydrocarbon which separates out in the solid state.

4. A process of removing hydrocarbon impurities from an aqueous solution of a mixture of primary and secondary alkane and chloroalkane mono- and polysulphonic acid alkali metal salts having at least 12 carbon atoms which comprises mixing therewith in the liquid state a hydrocarbon having a melting point between 30° C. and 80° C., allowing the mixture to stand, removing the layer of molten hydrocarbon which forms, cooling the aqueous phase, and removing the hydrocarbon which separates out in the solid state.

5. A process of removing hydrocarbon impurities from an aqueous solution of a water soluble salt of a saturated hydrocarbon sulphonic acid having at least 12 carbon atoms which comprises mixing therewith in the liquid state a petroleum hydrocarbon wax, allowing the mixture to stand, removing the layer of molten hydrocarbon which forms, cooling the aqueous phase, and removing the wax which separates out in the solid state.

CLYDE O. HENKE.